United States Patent
Bakker (10) Patent No.: US 11,097,409 B2
(45) Date of Patent: *Aug. 24, 2021

(54) POWER TOOL ASSEMBLY WITH SELECTABLE-VOLTAGE BATTERY PACK

(71) Applicant: KOKI HOLDINGS CO., LTD., Tokyo (JP)

(72) Inventor: Rients Bakker, Tokyo (JP)

(73) Assignee: KOKI HOLDINGS CO., LTD., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/698,689

(22) Filed: Nov. 27, 2019

(65) Prior Publication Data

US 2020/0094391 A1  Mar. 26, 2020

Related U.S. Application Data

(63) Continuation of application No. 15/122,766, filed as application No. PCT/GB2015/050651 on Mar. 6, 2015, now Pat. No. 10,946,508.

(30) Foreign Application Priority Data

Mar. 6, 2014  (GB) .................................. 1403971

(51) Int. Cl.
*B25F 1/00* (2006.01)
*B25F 5/00* (2006.01)
*H01M 50/20* (2021.01)
*H01M 50/543* (2021.01)

(52) U.S. Cl.
CPC ............ *B25F 5/00* (2013.01); *B25F 5/008* (2013.01); *H01M 50/20* (2021.01); *H01M 50/543* (2021.01); *H01M 2220/30* (2013.01)

(58) Field of Classification Search
None
See application file for complete search history.

(56) References Cited

U.S. PATENT DOCUMENTS 3,694,729 A  9/1972 Jones
3,718,848 A  2/1973 Hines
(Continued)

FOREIGN PATENT DOCUMENTS

EP  2397277 A1  12/2011
EP  2559521 A1  2/2013
(Continued)

OTHER PUBLICATIONS

International Searching Authority, PCT/GB2015/050651, "The International Search Report and the Written Opinion", 11 pages, dated Sep. 15, 2016.

(Continued)

*Primary Examiner* — Lucas J. O'Donnell
(74) *Attorney, Agent, or Firm* — McDermott Will & Emery LLP (57) ABSTRACT

The invention relates to a power tool and battery pack assembly including a battery pack for connection with the power tool to provide power for the operation of the power tool when connected thereto. The battery pack includes a plurality of power cells and connection means are provided to allow the selective supply of power at least a first or second voltage level to the power tool from the battery pack.

10 Claims, 7 Drawing Sheets

(56) References Cited

U.S. PATENT DOCUMENTS

| | | | |
|---|---|---|---|
| 5,506,456 A | 4/1996 | Yang | |
| 2005/0193538 A1 | 9/2005 | Quinn et al. | |
| 2006/0091858 A1 | 5/2006 | Johnson et al. | |
| 2011/0250484 A1* | 10/2011 | Meng | H01M 10/0445 |
| | | | 429/97 |
| 2016/0020443 A1 | 1/2016 | White et al. | |
| 2017/0222454 A1 | 8/2017 | Bakker | |

FOREIGN PATENT DOCUMENTS

| | | |
|---|---|---|
| JP | 09-283109 A | 10/1997 |
| JP | 2011-015538 A | 1/2011 |
| JP | 2012-066333 A | 4/2012 |

OTHER PUBLICATIONS

U.S. PTO Non-Final Office Action issued in related parent U.S. Appl. No. 15/122,766, dated Nov. 7, 2019.
U.S. PTO Final Office Action issued in related parent U.S. Appl. No. 15/122,766, dated Apr. 24, 2019.
U.S. PTO Non-Final Office Action issued in related parent U.S. Appl. No. 15/122,766, dated Jul. 12, 2018.
Entire U.S PTO Image File Wrapper associated with related parent U.S. Appl. No. 15/122,766, filed Aug. 31, 2016.
U.S. PTO Non-Final Office Action issued in related U.S. Appl. No. 15/122,766, dated Jun. 29, 2020.
U.S. PTO Non-Final Office Action issued in related U.S. Appl. No. 15/486,112, dated Jul. 23, 2020.
U.S. PTO Non-Final Office Action issued in related U.S. Appl. No. 16/698,662, dated Sep. 16, 2020.

* cited by examiner

POWER TOOL ASSEMBLY WITH SELECTABLE-VOLTAGE BATTERY PACK

CROSS REFERENCES TO RELATED APPLICATIONS

This application is a Continuation of U.S. patent application Ser. No. 15/122,766, filed on Aug. 31, 2016, which is an U.S. National Phase under 35 U.S.C. § 371 of International Application No. PCT/GB2015/050651, filed on Mar. 6, 2015, which claims the benefit of Great Britain Application No. 1403971.3, filed on Mar. 6, 2014, the entire contents of each are hereby incorporated by reference.

TECHNICAL FIELD

The invention to which the application relates is a portable power supply, typically of a form referred to as a battery pack, which can be detachably attached to a powered item such as a power tool in order to allow the power tool to be rendered operable when the battery pack is at least partially charged.

BACKGROUND

The provision of battery packs which can be attached to a power tool to allow power to be supplied to operate the tool is well known. Conventionally, for tools such as drills, reciprocating saws and the like two versions of particular models will be provided, a first version with a mains power supply connection and a second version in which the power is supplied from the connected battery pack and which therefore allows the tool to be used at locations where a mains power supply is not readily connectable.

The battery pack typically comprises a plurality of cells which are interconnected so as to provide power therefrom. The cells are provided within, typically, a sealed housing, and the housing is provided with location means to allow the battery pack to be located and electrically connected with the power tool to provide power thereto and also provided with location means to allow the battery pack to be electrically connected to a charger device to allow the recharging of the batteries in the battery pack.

For the battery pack to be usable, the same needs to be periodically charged and the frequency at which the charge needs to be made can be dependent upon a number of factors, alone, or in combination, and which can include, the level and load of the usage of the power tool, the capacity of the battery pack, the age of the battery pack and/or the form of the cells provided therein. The type, speed and power of power tools which can be operated in conjunction with a battery pack can also be limited by the above factors. It is therefore found that while the use of battery packs has undoubted advantages in allowing the greater flexibility of location of usage of the same, the user of the power tool can become frustrated by the lack of full power of the power tool when operated and/or the lack of time between the need to recharge the battery pack.

In addition to the above, the conventional battery packs provided for use with power tools are typically configured to provide a power supply at a specific voltage, most typically 18 Volts. The conventional 18 Volt battery packs are typically provided in two forms, with a housing in which 5 power cells or batteries are provided or with a housing in which 10 power cells or batteries are provided. An advantage of the 5 cell battery pack is that the same is more compact and lighter than the 10 cell pack and therefore does not add significant weight to the power tool when the same is connected thereto. An advantage of using the 10 cell pack is that it can have a longer discharge power time n higher current draw capability than the 5 cell pack.

The means of connection with the power tools and/or battery pack can typically be selected to suit specific power tool and/or charger requirements and it is commonly the case that a battery pack is provided for use with a number of tools which are common to one manufacturer but cannot be used on power tools which are common to another manufacturer. However, in each case, typically the connections will include an 18V and 0V connecting terminal, each of which is provided in the form of a female socket provided in one of the battery pack or power tool and a male plug provided in the other of the battery pack or power tool.

In addition to the cells, the battery pack and/or the power tool may include power supply control means which allow the controlled charging of the cells and the discharge of power from the same to the power tool.

However, a problem with the conventional battery packs is that they are currently designed to supply a fixed voltage, such as 18V, as the convention is that the manufacturers of the same and the power tools have an obligation to support the users of their tools which are already in the marketplace and which are already operating using 18V power packs. This therefore creates an inertia in terms of developing battery packs which can provide a different voltage as these would then not be usable on the existing power tools. This is the case even though different tools to which the battery pack can be attached require different power wattage values in order to operate safely and most efficiently. This means that when controlling the operation of the battery pack to supply power to a range of tools with different power or "current draw" requirements, such as, for example, a chainsaw and a torch, which have significantly different operating power requirements, considerable design and control hardware and software components are required to be provided to control the power supplied in a manner which is sufficient to allow operation of the power tool in a safe manner. It also means that for power tools which require relatively high power supply thereto, such as a motor for the chainsaw, the current which is produced has to be relatively high in order to achieve the required power Wattage, with 300 W currently being the typical upper limit which can be provided whilst maintaining control of operation of the power tool motor. As the voltage is for example rated at 18 Volts it is only possible to increase the current in order to increase the power. However to increase the power from 300 W to 450 W requires a current increase of 50% and the current draw increase relates directly to the component cost increase. In addition, this provides significant additional expense to the conventional battery pack which is provided with a fixed voltage output. Furthermore, if the control means of the battery pack malfunction then there is a risk of damage being caused to the power tool to which the battery pack is connected. There can also be concern over the ability to control the operation of the motor of the power tool when the efficient operation of the motor is exceeded. In addition, higher current draw will significantly reduce the life of the battery.

Attempts to provide battery packs which provide a higher, fixed voltage, have, to date, been in the form of large and bulky packs due to the relatively large number of cells required to be accommodated therein in order to provide the higher Voltage, and which therefore adds significant weight to the power tool or another option has been to use two lower fixed voltage battery packs in combination which provides the additional weight problem and also raises problems in terms of accommodating the two packs on the body of the power tool as well as the need to charge two battery packs simultaneously.

US20130002175 discloses a battery pack system in which there are provided different types of battery packs and attachment means and control means are provided in order to allow a wider range of battery packs to be used safely on the same tool. The disclosure also prevents battery packs which would not be safe to use with a particular power tool from being used.

SUMMARY

The aim of the present invention is to provide a battery power pack which can be used in conjunction with power tools and which can be used to provide more than one voltage supply. A further aim is to provide a battery power pack which has increased flexibility and which allows the voltage which can be provided from the same to be selectable and thereby be better suited to the operation of the particular power tool to which the battery pack is fitted at that time.

In a first aspect of the invention there is provided a power tool and battery pack assembly which, when connected, allows power to be provided for operation of the power tool when connected thereto, said battery pack including a plurality of power cells wherein connection means in a form which select the provision of power of at least a first voltage or a second voltage from the battery pack to the power tool In one embodiment the at least two voltages which can be selectively provided are a first voltage "n"V and a second voltage "2n"V. In one embodiment n has a value in the range of 16-22V.

In one embodiment the two voltages which can be selectively provided are 18V and 36V.

In one embodiment the addition or removal of power cells to or from the battery pack is not required in order to allow the alteration of the Voltage supplied.

Preferably, the voltage which is supplied is selected via interaction between the power tool and the battery pack.

In one embodiment the interaction is mechanical interaction between the battery pack and the power tool such that the particular electrical terminal connection means configuration causes the supply of the first or second voltages from the battery pack.

In another embodiment the interaction is electrical interaction as well as, or instead of, the connection means interaction. In this embodiment the electrical interaction used can be the determination of the voltage supply which is required to operate the particular power tool once the battery pack has been connected thereto.

Typically the connection means include safety means to prevent the supply is of the incorrect voltage to the power tool to which the battery pack is connected at that time.

In one embodiment the cells provided within the battery pack remain in the same location in the battery pack regardless of which voltage is provided and no access to the interior of the housing or to the power cells is required to change the voltage. Typically the connection configuration between the power cells and the connection means terminals of the battery pack from which power is supplied to the power tool is selected in response to the form of the connection of the connection means at that time to thereby select the particular voltage which is to be provided to the power tool.

In one embodiment a first connection configuration provides the power cells of the battery pack in series connection and in a second connection configuration provides the power cells of the battery pack in parallel connection. Typically when the power cells are provided in the first, series, configuration power is supplied, at the higher of the two voltages to the power tool from the battery pack.

In one embodiment the battery pack is connectable to a charging device and the configuration of the cells in the battery pack is selected to be in a predefined charging configuration. Typically the battery pack is charged at the higher of the at least two voltages which can be supplied from the battery pack.

In one embodiment the power tool includes a plurality of connection means electrical terminals provided on the power tool to be connected to connection means electrical terminals on the battery pack and wherein the battery pack includes a greater number of electrical terminals than the power tool and the voltage supplied from the battery pack to the power tool is determined by the location of the said power tool electrical terminals with respect to the battery pack terminals when connected therewith.

Typically two power tool electrical terminals are provided and located such that it is only possible for the same to be connected to two of the plurality of electrical terminals provided on the battery pack and hence allow the correct voltage to be provided to the power tool.

Typically engagement means are provided to allow the battery pack and power assembly to be engaged together in use to form an integral assembly. Typically release means are provided to allow the release of the engagement mans and the battery pack to be separated from the power tool.

In a further aspect of the invention there is provided a battery pack for connection with a power tool to provide power for the operation of the power tool when connected thereto, said battery pack including a plurality of power cells, said power cells connectable in a first connection configuration to provide a first voltage output and in a second connection configuration to provide a second voltage output.

In a yet further aspect of the invention there is provided a power tool to which power is provided from a battery pack for operation and said power tool includes connection means to allow electrical connection with the battery pack to allow power to pass from the battery pack to the power tool and wherein the location of the connection means is such that, when connected to the power tool, a particular voltage, from a range of voltages at which power can be supplied from is the battery pack, is selected.

The provision of the connection means to allow the selective provision of one of at least two possible voltages also allows greater power flexibility to be provided from the battery pack without adversely affecting the weight or location requirements of the battery pack.

Typically the battery pack is capable of providing power at two different voltage levels and the particular voltage level which is supplied is dependent upon the connection means condition and, in turn the connection configuration between the power cells of the battery pack and the connection terminals on the battery pack.

Significantly, the current requirement for both operation of the power tool and the charging of the battery pack is reduced as typically the battery pack will be charged with the cells connected configuration in series. As power equals current x voltage, the power provided can be at least maintained but the costs for doing so will be lower as the lower current is required.

The invention as herein defined allows the range of power tools which can be operated by the attachment to the battery pack in accordance with the invention to be increased such as, for example, the operation of bench power tools by power supplied by a battery pack in accordance with the invention connected thereto.

By providing the battery pack and power tool in the form herein described so one of at least two voltages which is most appropriate for the power tool to which the battery pack is connected at that time, can be provided by the battery pack to the power tool. This therefore means that the control means required to control the operation of the battery pack is significantly reduced as the demands for power or draw of a particular power tool can more efficiently and safely be provided by the provision of the appropriate voltage supply and hence the demands on control of the current provided are reduced. This, in turn, means that the hardware which is conventionally required to be provided in the battery pack as part of the control means can be reduced or indeed removed and still allow the battery pack to operate safely and with a reduced cost of manufacture of the same. Thus, the power output from the battery pack is higher with reduced loss and reduced heat generation.

BRIEF DESCRIPTION OF THE DRAWINGS

Specific embodiments of the invention are now described with reference to the accompanying drawings; wherein.

DETAILED DESCRIPTION

Figure 1:
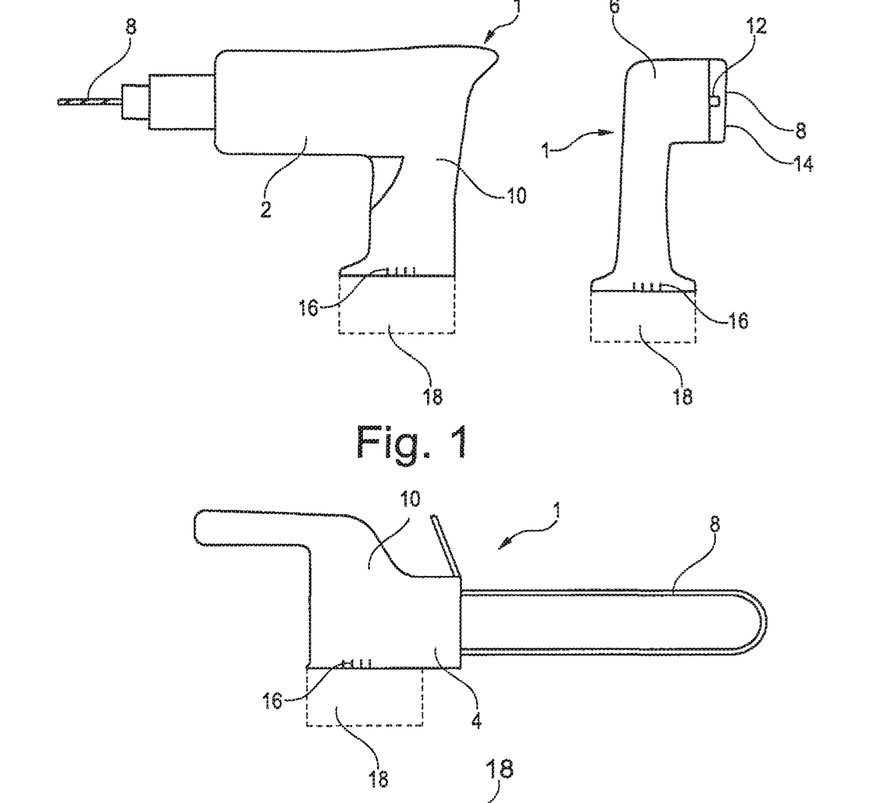
FIG. 1 illustrates a range of power tools with which a battery pack in accordance with the invention may be used to provide power.

Referring firstly to FIG. 1 there is illustrated a range of power tools 1 as examples of the type of power tool with which a portable battery pack in accordance with the invention can be utilized. The examples given are of a drill 2, chainsaw 4, torch 6. In each case the power tool has a working portion 8 which is provided with power to operate. In the case of the chainsaw and the drill the same are provided with a motor within the housing 10 which causes the movement of the working portion 8 and in the torchlight a bulb 12 is provided to allow light to be emitted from the face 14 of the torchlight. In each case, the body is provided with electrical connection means, typically in the form of pins 16, which are positioned so as to be received in matching slots provided in the battery pack 18 which can be mechanically located with the housing, as shown in broken lines. When electrical connection has been made, typically automatically upon the correct mechanical location of the battery pack with the housing, power is supplied from the battery pack to the power tool to allow the same to be used. The battery pack and power tool are provided with engagement means which allow the battery pack to be engaged with the power tool and form an integral part thereof when the power tool is in use and power is being supplied thereto. Release means are provided which allow disengagement of the battery pack from the tool, most typically to allow the battery pack to be charged separately from the power tool.

Figure 2:
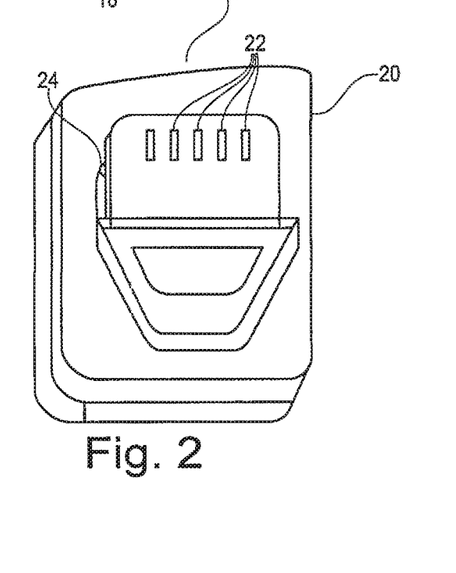
FIG. 2 illustrates a battery pack of a form in which the battery pack of the current invention can be provided.

FIG. 2 illustrates in more detail an example of a battery pack 18 in accordance with one embodiment and the same comprises a housing 20 within which a series of batteries or cells are located in a fixed and interconnected position. During use of the battery pack 18 no access is required to be made to the power cells and the periodic charging of the cells can be achieved via connection with a battery charger, most typically using the same connection means electrical terminal slots 22 and mechanical connection means 24 which allow connection with the matching connection means of the power tool. The engagement means are provided to allow the battery pack 18 to be located and locked on the power tool.

Figure 3:
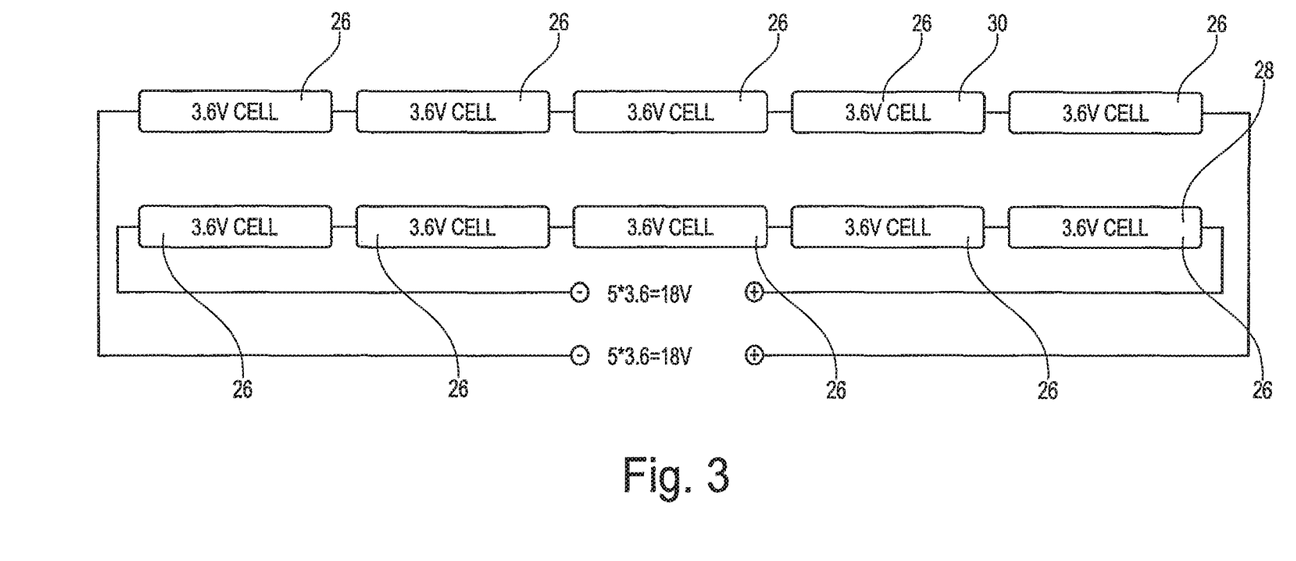
FIG. 3 illustrates the layout of the battery pack cells for use in accordance with one embodiment of the invention.

FIG. 3 illustrates the layout of a series of batteries or power cells 26 within a battery pack in accordance with the invention and it will be seen that two "banks" or "groups" 28, 30 of the cells are provided. The cells 26 in each group are interconnected in series and are provided with connections which can provide 18V which lead to connection terminals which are described in more detail with regard to FIGS. 4a and 4b. Typically each of the cells are of the same voltage.

Figure 4A:
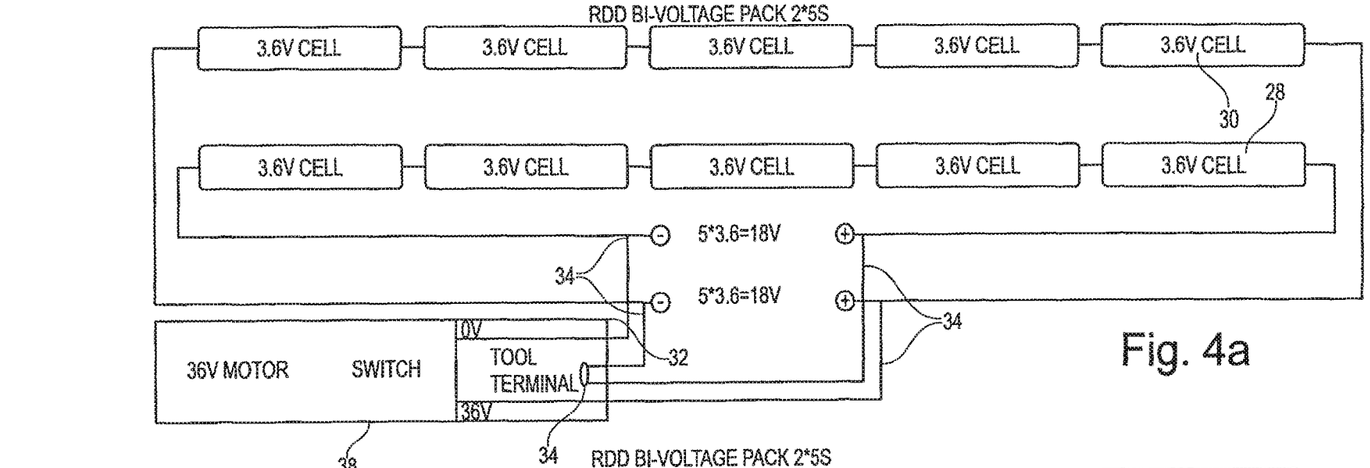
FIGS. 4a and 4b illustrate first and second connection configurations of the power cells of the battery pack of FIG. 3 in accordance with the invention.

In accordance with the invention the connection configuration between the groups of cells 28, 30 and the connection terminals at interface 32 with the power tool 1 can be provided in at least two configurations. A first configuration 34 is shown in FIG. 4a in which the groups of cells 28, 30 are provided in series at the connections to the connection means electrical terminals and in FIG. 4b the groups of cells 28,30 are provided in a parallel configuration 36 at the connection means electrical terminals. In the first configuration the cells provide 36 Volts to the power tool and in the second configuration the battery pack delivers 18V to the power tool, from the same cells provided in the battery pack. This therefore allows the battery pack to be range taking inasmuch that the same battery pack can be used to provide power at different voltages to the power tool and also means that higher power can be provided to those tools that require the same without having to unduly increase the current capability.

Figure 4B:
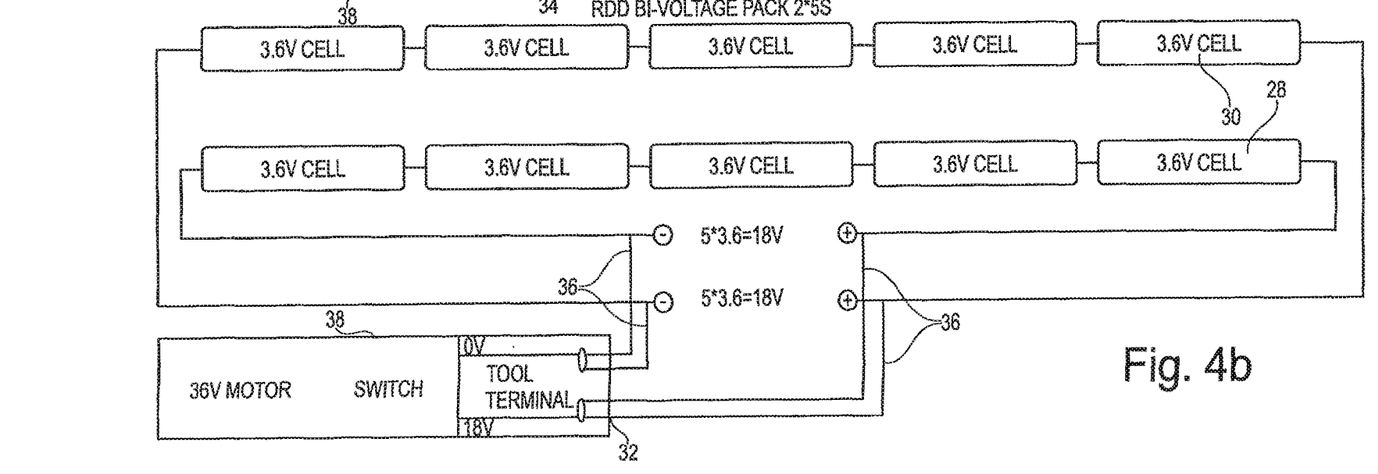

Typically the selection of the particular configuration and hence the voltage which is delivered from the power pack is as a result of mechanical connection in which case the power tool is provided with connection means to control the operation of the connection means to the configuration 34 or 36 provided on the battery pack when the battery pack is being connected to or is connected with the power tool.

Figure 5A:
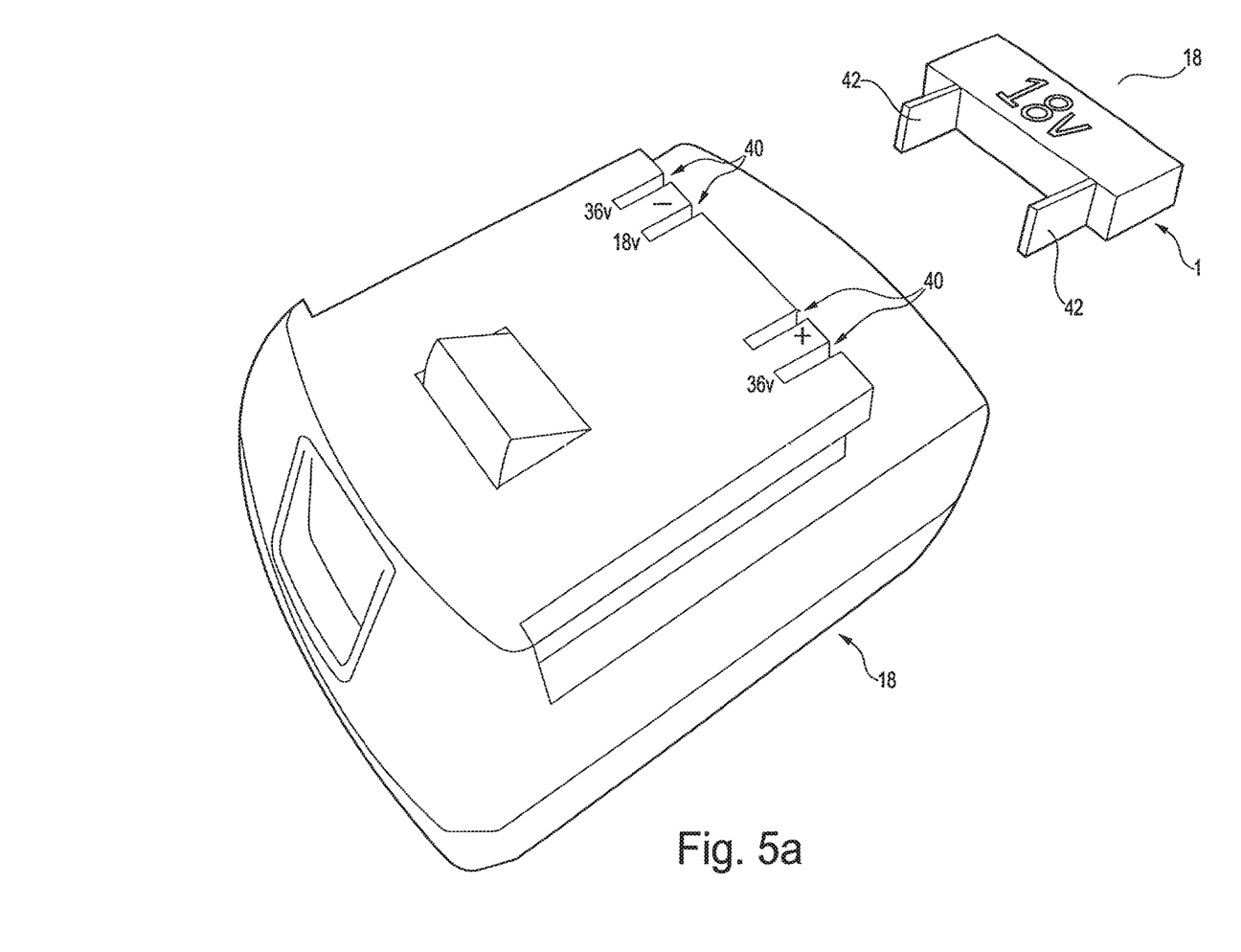
FIGS. 5a and 5b illustrate the connection means of the power tool in different configurations separate from the battery pack in accordance with an embodiment of the invention.
Figure 5B:
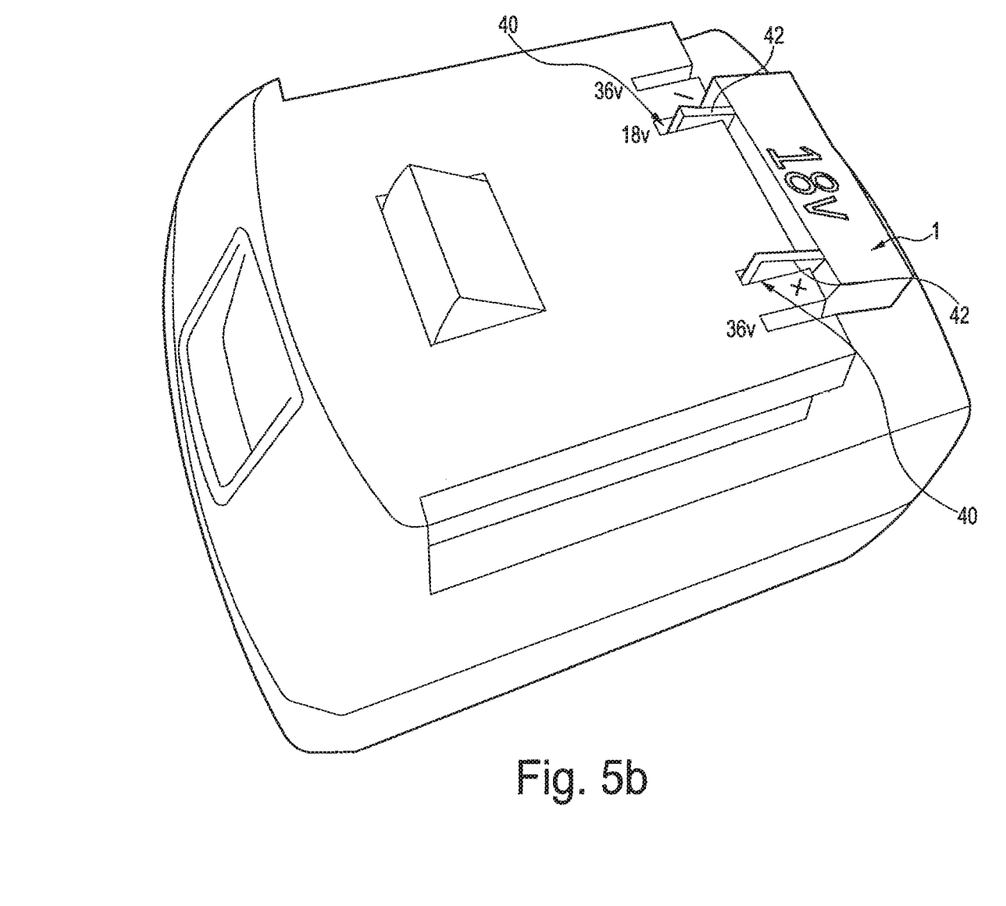
Figure 6A:
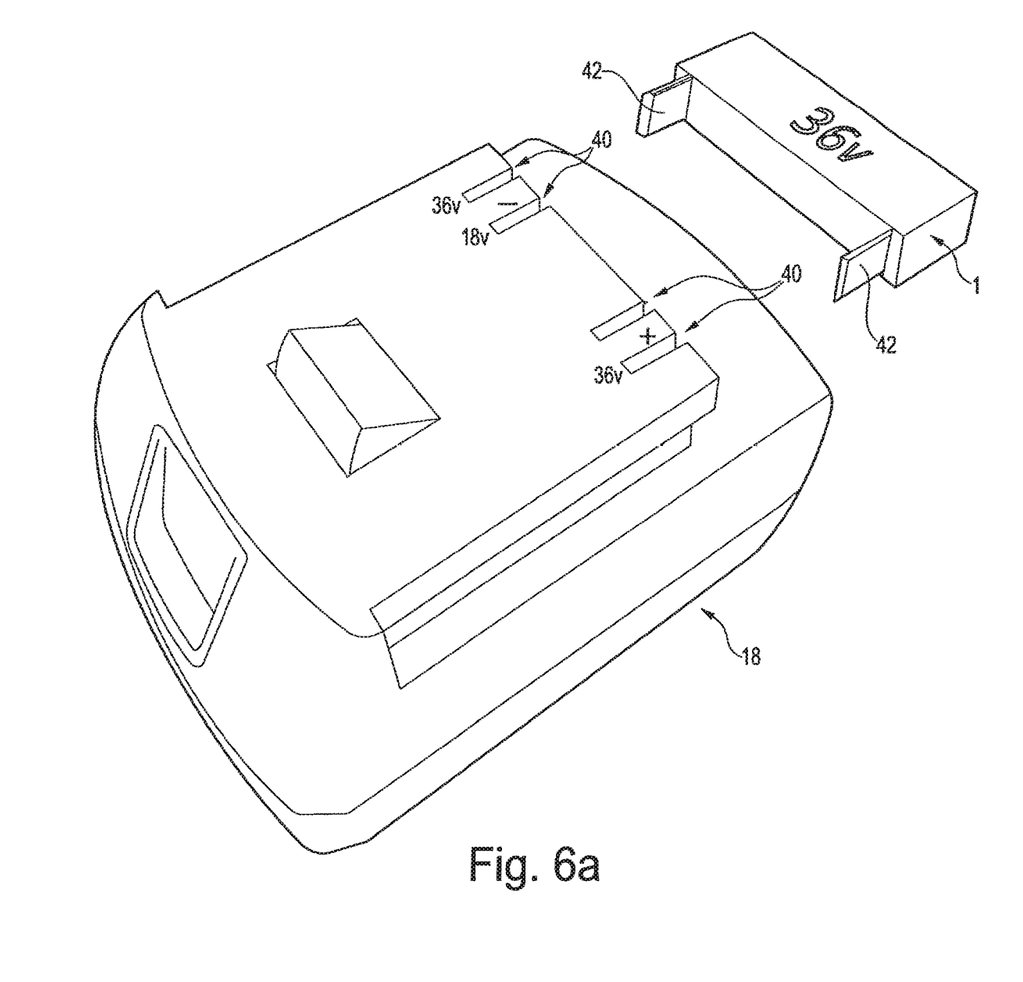
FIGS. 6a and 6b illustrate the parts of FIGS. 5a and 5b in connection.
Figure 6B:
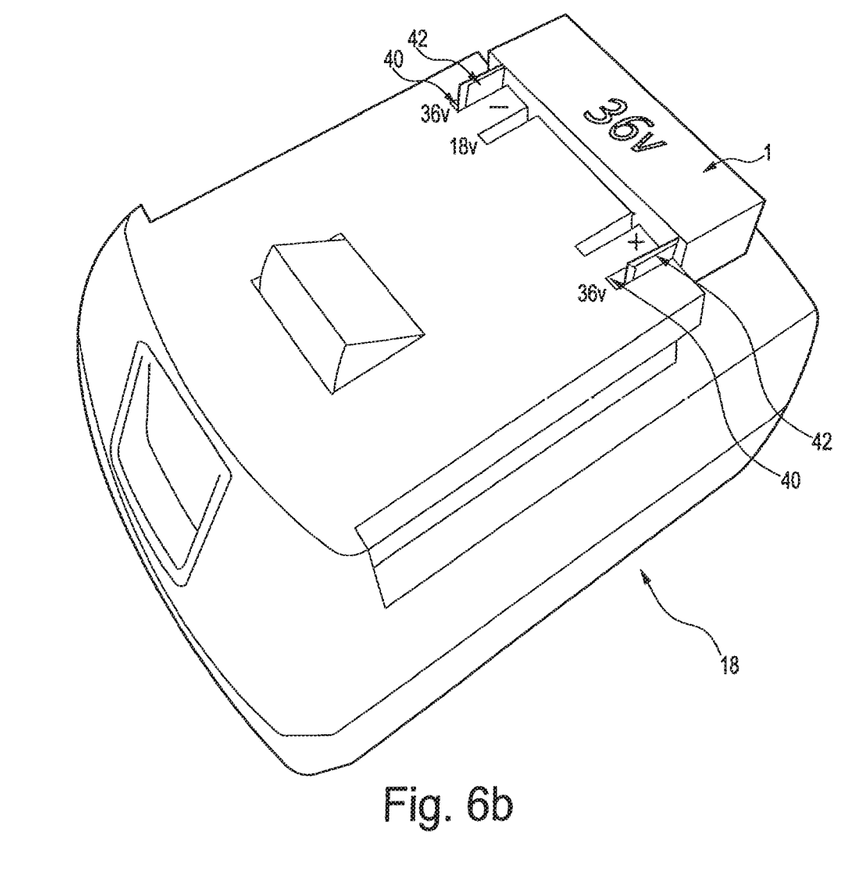

FIGS. 5a-5b and 6a-6b illustrate an embodiment of this form in which the FIGS. 5a and 5b illustrate the power tool 1 separate from the battery pack 18 and FIGS. 6a and 6b illustrate the battery pack 18 and power tool 1 in connection so that power can be supplied thereto. In this embodiment the selection of the voltage of the power supply is made by providing the battery pack with a number of connection means female electrical terminals 40 with a first pair of the terminals allowing connection to the power cells in a first connection configuration for an 18 Volt power supply and the second pair of the electrical terminal allowing connection to the power cells in a second connection configuration for the 36 Volt power supply, i.e the selective connection to one of the power cell configurations of FIG. 4a or 4b.

The power tool is provided with two male electrical terminal plug connection means 42. In FIGS. 5a and 6a the plug connection means are located and spaced apart so as to be received in the inwardly positioned pair of female electrical terminals 40 which will allow connection to the 18 Volt power supply from the battery pack. In FIGS. 5b and 6b the plug connection means 42 are spaced apart by a greater distance than those in FIGS. 5a and 6a and so will be received in, and connected with, the outer positioned female connection, means 40 on the battery pack 18 which are connected to the power cells in the 36 Volt power supply configuration. It will also be appreciated that the provision of the male plug connection means in the appropriate locations means that this will be matched with the required voltage for the motor of that power tool. It also means that it is not possible for the power tool to be connected to the battery pack to receive the incorrect, and possibly damaging voltage power supply.

It should also be appreciated that other spacings of the connection means plugs can be provided other than, those indicated in FIGS. 5a-5b and 6a-6b.

In addition or alternatively the voltage selection can be made via actuation means such as the switch 38 of the power tool which can be operated by a user and which may be provided on the power tool. Typically the actuation means will have to be operated before the power supply can be provided to the power tool. In another embodiment the actuation means may be operated to control the switch upon transmission and detection of a signal from the power tool to indicate the voltage which is to be provided to the same for operation. It is preferred that as much of the control means for the operation of the battery pack is provided on the power tool as can be achieved, principally as the power tool lifetime is typically longer than that of the battery pack and therefore it is unattractive to discard the battery pack at the end of ifs life with what may be relatively expensive control means provided therewith.

The invention claimed is:

1. An assembly comprising a power tool selected from a first power tool or a second power tool different from the first power tool, and a battery pack, the battery pack being configured to provide power to the power tool when the battery pack is connected to the power tool,
    wherein the battery pack comprises a plurality of groups of power cells and a plurality of connection portions configured to select a voltage of the power from at least a first voltage or a second voltage lower than the first voltage, each group of power cells having a plurality of power cells connected in series,
    wherein, when the battery pack is connected to the power tool, the plurality of connection portions are configured to select the voltage provided to the power tool in response to a form of mechanical interaction between the plurality of connection portions and the power tool,
    wherein, when the power tool is the first power tool and the battery pack is connected to the first power tool, the mechanical interaction is in a first form and the plurality of groups of power cells are connected in series to provide the first voltage to the first power tool, and
    wherein, when the power tool is the second power tool and the battery pack is connected to the second power tool, the mechanical interaction is in a second form different from the first form, and the plurality of groups of power cells are connected in parallel to provide the second voltage to the second power tool.

2. The assembly according to claim 1,
    wherein, the mechanical interaction includes mechanical connection between the plurality of connection portions and the power tool.

3. The assembly according to claim 1,
    wherein, when the mechanical interaction is in the first form, at least a first part of the plurality of connection portions is mechanically connected to the first power tool, and
    wherein, when the mechanical interaction is in the second form, the first part of the plurality of connection portions is not mechanically connected to the second power tool.

4. The assembly according to claim 3,
    wherein the first part of the plurality of connection portions is formed as a first battery electrical terminal connected to the plurality of power cells.

5. The assembly according to claim 4,
    wherein the plurality of connection portions comprises a pair of first battery electrical terminals including the first battery electrical terminal,
    wherein the first power tool comprises a pair of first tool electrical terminals connectable to the first pair of battery electrical terminals, and
    wherein, when the battery pack is connected to the first power tool, the pair of first battery electrical terminals are connected to the pair of first tool electrical terminals.

6. An assembly comprising a first power tool, a second power tool different from the first power tool, and a battery pack, the battery pack being configured to provide power to the first or second power tool when the battery pack is connected to the first or second power tool,
    wherein the battery pack comprises a plurality of groups of power cells and a plurality of connection portions configured to select a voltage of the power of at least a first voltage or a second voltage lower than the first voltage, each group of power cells having a plurality of power cells connected in series,
    wherein, when the battery pack is connected to the first or second power tool, the plurality of connection portions are configured to select the voltage provided to the first or second power tool in response to a form of mechanical interaction between the plurality of connection portions and the first or second power tool,
    wherein, when the battery pack is connected to the first power tool, the mechanical interaction is in a first form and the plurality of groups of power cells are connected in series to provide the first voltage to the first power tool, and
    wherein, when the battery pack is connected to the second power tool, the mechanical interaction is in a second form different from the first form, and the plurality of groups of power cells are connected in parallel to provide the second voltage to the second power tool.

7. The assembly according to claim 6,
    wherein, the mechanical interaction includes mechanical connection between the plurality of connection portions and the first or second power tool.

8. The assembly according to claim 6,
    wherein, when the mechanical interaction is in the first form, at least a first part of the plurality of connection portions is mechanically connected to the first power tool, and
    wherein, when the mechanical interaction is in the second form, the first part of the plurality of connection portions is not mechanically connected to the second power tool.

9. The assembly according to claim 8,
wherein the first part of the plurality of connection portions is formed as a first battery electrical terminal connected to the plurality of power cells.

10. The assembly according to claim 9,
wherein the plurality of connection portions comprises a pair of first battery electrical terminals including the first battery electrical terminal,
wherein the first power tool comprises a pair of first tool electrical terminals connectable to the pair of first battery electrical terminals, and
wherein, when the battery pack is connected to the first power tool, the pair of first battery electrical terminals are connected to the pair of first tool electrical terminals.

* * * * *